United States Patent
Oye

(10) Patent No.: US 9,520,258 B2
(45) Date of Patent: Dec. 13, 2016

(54) SELECTIVE SYNTHESIS OF NANOTUBES WITHOUT INHIBITOR

(71) Applicant: Eloret Corporation, Moffett Field, CA (US)

(72) Inventor: Michael Mikio Oye, Oxnard, CA (US)

(73) Assignees: ELORET CORPORATION, Moffett Field, CA (US); Michael Mikio Oye, Oxnard, CA (US)

( * ) Notice: Subject to any disclaimer, the term of this patent is extended or adjusted under 35 U.S.C. 154(b) by 10 days.

(21) Appl. No.: 14/607,533

(22) Filed: Jan. 28, 2015

(65) Prior Publication Data

US 2016/0217962 A1    Jul. 28, 2016

(51) Int. Cl.
| | | |
|---|---|---|
| *H01J 9/00* | (2006.01) | |
| *H01J 9/02* | (2006.01) | |
| *H01J 1/304* | (2006.01) | |
| *B82Y 40/00* | (2011.01) | |
| *B82Y 20/00* | (2011.01) | |

(52) U.S. Cl.
CPC .............. *H01J 9/025* (2013.01); *H01J 1/3042* (2013.01); *B82Y 20/00* (2013.01); *B82Y 40/00* (2013.01); *Y10S 977/843* (2013.01); *Y10S 977/939* (2013.01)

(58) Field of Classification Search
CPC ................................. H01J 9/025; H01J 1/3042
USPC ....................................................... 445/49–51
See application file for complete search history.

(56) References Cited

U.S. PATENT DOCUMENTS 6,811,957 B1 * 11/2004 Mau ....................... B82Y 30/00
430/311

* cited by examiner

*Primary Examiner* — Joseph L Williams
(74) *Attorney, Agent, or Firm* — Fabian VanCott; Jeffrey Riddle

(57) ABSTRACT

A method of forming nanotubes may include applying a photoresist to a metal substrate, selectively exposing a first portion of the photoresist to electromagnetic radiation while not exposing a second portion to the electromagnetic radiation, removing the second portion of the photoresist from the metal substrate exposing a first portion of the metal substrate, exposing the first portion of the metal substrate to an etchant removing the first portion of the photoresist exposing a second portion of the metal substrate, and growing carbon nanotubes on the second portion of the metal substrate.

20 Claims, 10 Drawing Sheets

SELECTIVE SYNTHESIS OF NANOTUBES WITHOUT INHIBITOR

BACKGROUND

A carbon nanotube is a specific allotrope of carbon where a number of carbon atoms form a cylindrical nanostructure. Carbon nanotubes (CNTs) provide a number of beneficial properties such as electrical conductivity, strength, and toughness.

BRIEF DESCRIPTION OF THE DRAWINGS

The accompanying drawings illustrate various examples of the principles described herein and are a part of the specification. The illustrated examples are given merely for illustration, and do not limit the scope of the claims.

Throughout the drawings, identical reference numbers designate similar, but not necessarily identical, elements.

DETAILED DESCRIPTION

Figure 1:
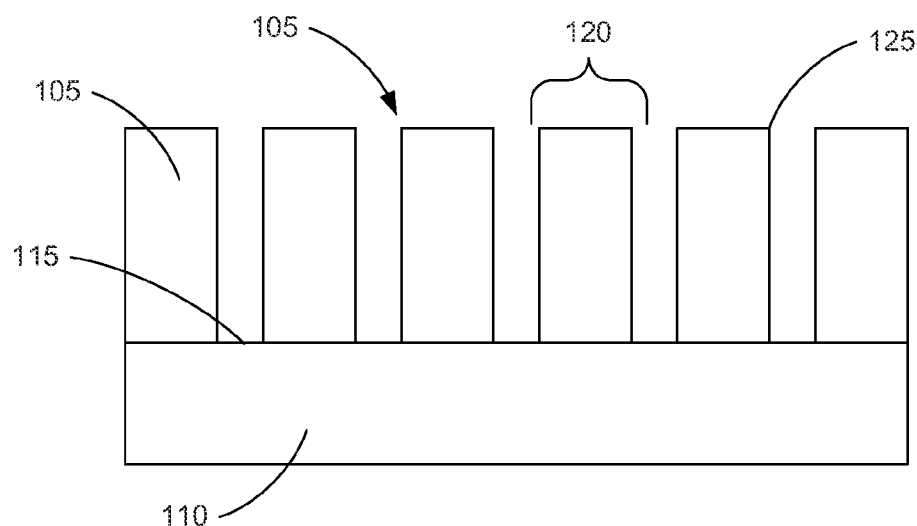
FIG. 1 is a cross-sectional block diagram of carbon nanotubes formed on a metal substrate according to one example of the principles described herein.

As stated above, carbon nanotubes (CNTs) provide a number of beneficial properties such as electrical conductivity. The electrical conductivity allows a number of nanotubes to act as, for example, an electron source by which electrons are ejected from the ends of the CNTs upon application of a voltage. Electron emissions produced by an electron source could be used in a number of applications such as lighting and amplification of electrical signals. Generally, the production of electrons in an electron emission source is more easily accomplished through sharp edges being produced. The CNTs described herein can provide those sharp edges when patterned appropriately on a growing surface.

The present specification, therefore, describes a method of forming nanotubes comprising applying a photoresist to a metal substrate, selectively exposing a first portion of the photoresist to electromagnetic radiation while not exposing a second portion to the electromagnetic radiation, removing the second portion of the photoresist from the metal substrate exposing a first portion of the metal substrate, exposing the first portion of the metal substrate to an etchant, removing the first portion of the photoresist exposing a second portion of the metal substrate, and growing carbon nanotubes on the second portion of the metal substrate.

The present specification further describes a method of forming an electron source with nanotubes comprising depositing a layer of photoresist onto the surface of a metal substrate, applying a mask to the surface of the photoresist and selectively exposing a first portion of the photoresist to electromagnetic radiation while not exposing a second portion to the electromagnetic radiation, removing the second portion of the photoresist from the metal substrate exposing a first portion of the metal substrate, exposing the first portion of the metal substrate to an etchant, removing the first portion of the photoresist exposing a second portion of the metal substrate, and growing nanotubes on the second portion of the metal substrate.

Still further, the present specification describes a system for forming nanotubes comprising a photoresist applicator to apply a photoresist to a metal substrate, an electromagnetic radiation source to selectively apply a first portion of the photoresist to electromagnetic radiation while not exposing a second portion to the electromagnetic radiation, an etchant applicator to expose a first portion of the metal substrate to an etchant, the first portion of metal substrate being exposed after removing the second portion of the photoresist from the metal substrate, and a carbon nanotube synthesizer to grow carbon nanotubes on the second portion of the metal substrate.

In these examples, the fabrication or growing of CNTs does not comprise any deposition of a catalyst or an inhibitor. Instead, the selective application of an etchant to various portions of a metal substrate provides a roughened surface sufficient to inhibit the growth of CNTs in those locations. Consequently, the present method does not include these extra processes of application of the catalyst and inhibitor thereby increasing the production time and decreasing productions costs. Specifically, the processes described herein do not implement a separate closed device used to apply an inhibitor. Generally, the devices used to apply an inhibitor comprise a limited geometric shape allowing for a limited surface amount to have the inhibitor applied to it. Additionally, the process is a sealed process that uses an additional amount of time to apply the inhibitor. Consequently, not applying an inhibitor shortens the manufacturing time, saves costs in energy and apparatuses used, and increases productivity. Still further, the present method provides for the growing of CNTs directly on a metal substrate that comprises a relatively larger surface area. Consequently, the surface area of the substrate is no longer limited by the device used to deposit the inhibitor allowing for larger surfaces to be used.

As used in the present specification and in the appended claims, the term "portion" is meant to be understood broadly as a part of any whole, the part not constituting the whole.

Additionally, as used in the present specification and in the appended claims, the term "a number of" or similar language is meant to be understood broadly as any positive number comprising 1 to infinity.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an example" or similar language means that a particular feature, structure, or characteristic described in connection with that example is included as described, but may not be included in other examples.

Turning now to the figures, FIG. 1 is a cross-sectional block diagram of carbon nanotubes (105) formed on a metal substrate (110) according to one example of the principles described herein. The carbon nanotubes (CNTs) (105) are an allotrope of elemental carbon having a cylindrical nanostructure. One end of each CNT may connect to the surface of the metal substrate (110) during the growing process. The metal substrate (110) may vary in thickness. In one example, the thickness of the metal substrate (110) is about 0.5 mm.

The metal substrate (110) may comprise a catalyst onto which a nanotube (105) may be grown. The catalyst may be any substance that facilitates carbon nanotube growth. In one example, the catalyst may comprise a metal such as iron (Fe), chromium (Cr), nickel (Ni), cobalt (Co), nickel chromium (NiCr), iron-chromium-aluminum (FeCrAl), steel, or combinations thereof. In one example, the metal substrate (110) may comprise a metal alloy comprising iron (Fe), nickel (Ni), cobalt (Co), chromium (Cr), or combinations thereof with varying percentages of each of these metals. In another example, the metal substrate (110) may comprise nickel chromium. In yet another example, the metal substrate (110) may comprise a metal capable of growing CNTs. In still another example, the metal substrate (110) may be a metal alloy capable of growing CNTs. In yet still another example, the metal substrate (110) may be a combination of any above examples.

The percentages of the catalyst metals described above may be varied to obtain a desired density of CNT growth. In one example, a nickel-chromium alloy may comprise about 70-80 percent nickel by weight. In another example, an iron-chromium-aluminum alloy may comprise about 70-80 percent iron by weight. Other percentages of the various elements making up the carious alloys may be used and the present specification contemplates the use of such alloys to form the metal substrate (110).

As will be described in more detail below, the CNTs (105) are formed on the metal substrate (110) after the metal substrate (110) has been modified such that the CNTs (105) grow on a portion of the entire surface of the metal substrate (110). The portions of the metal substrate (110) onto which the CNTs (105) are grown may form a pattern of CNT (105) bundles. The CNTs (105) are formed into CNT bundles (120) of varying density and surface area. The density of the CNT bundles (120) and surface area occupied on the metal substrate (110) by the bundles (120) may be altered according to the methods described in more detail below.

The pattering of the CNTs (105) or CNT bundles (120), in one example, is accomplished by an etching processing. The etching process may create a number of roughened areas (115) onto which CNTs are inhibited from growing. Additionally, the density of the CNT bundles (120) may be altered by selective application of an etchant to the surface of the metal substrate for varying durations of time. In one example, a first portion of the entire surface area of the metal substrate (110) may be subjected to, for example, an acid bath for a first length of time. In this example, a second portion of the entire surface area of the metal substrate (110) may be subjected to an acid bath for a second length of time. The first and second portions may, therefor, have a surface roughness that is different from each other thereby causing a first density of nanotubes to be grown on a portion of the entire surface area of the metal substrate (110) that was not subjected to the acid bath, a second density of nanotubes to be grown on the first portion of the entire surface area of the metal substrate (110), and a third density of nanotubes to be grown on the first portion of the entire surface area of the metal substrate (110). As such, selective application of individual portions of the metal substrate (110) to an etchant such as an acid for selected lengths of time may vary the density of the nanotubes grown thereon.

In one example, the patterning of the CNTs (105) or CNT bundles (120) is done without the deposition of a metal catalyst. In this example, the metal substrate (110) comprises a sufficient amount of catalytic metal atoms such that during a nanotube growth process, CNTs will form therefrom. In another example, the patterning of the CNTs (105) or CNT bundles (120) is done without the deposition of an inhibitor such as sputtering molybdenum or other inhibitors such as non-metal, polymer, or metal inhibitors. In this example, the etching of the metal substrate (110) defines those portions of the metal substrate (110) onto which CNTs (105) will not grow. In yet another example, the patterning of the CNTs (105) or CNT bundles (120) is done without the deposition of a metal catalyst or an inhibitor.

Additionally, the patterning of the nanotube bundles (120) may be varied. FIGS. 2A-2D each show a diagram of a number of nanotube bundle pattering arrangements according to a number of examples of the principles described herein. As described above, selective application of an etchant at portions of the metal substrate (110) may inhibit the growth of nanotubes. Each of FIGS. 2A-2D show a metal substrate (110) after having been etched and after having been subjected to a CNT growing process. The CNT bundles (120) are patterned according to the etching process with the CNTs bundles (120) growing in locations where the metal substrate (110) was not etched. In each figure, the solid black filled portions indicated CNT bundles (120) while white filled portions indicate etched areas of the metal substrate (110).

Figure 2A:
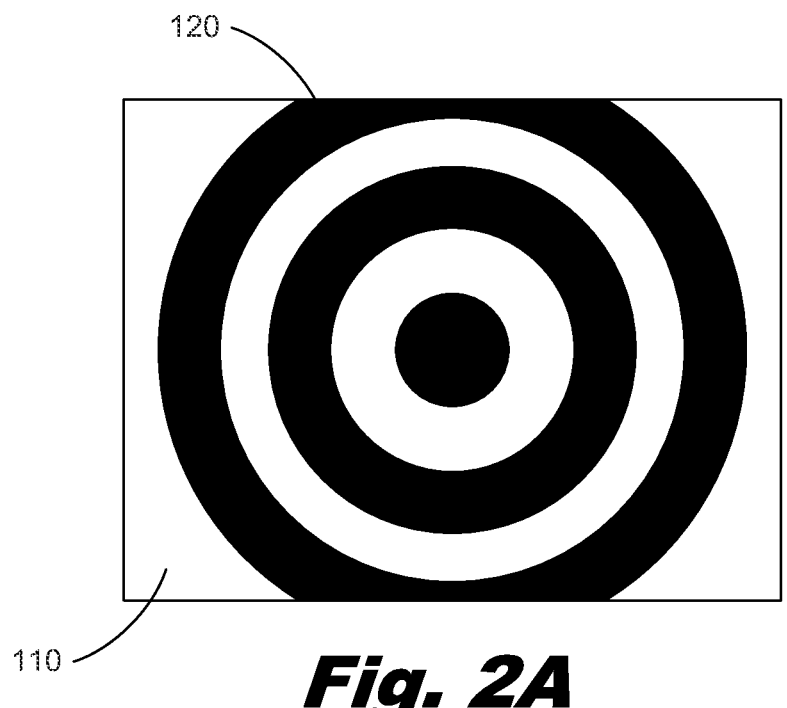
FIGS. 2A-2D are each diagrams of a number of nanotube bundle patterning arrangements according to a number of examples of the principles described herein.
Figure 2B:
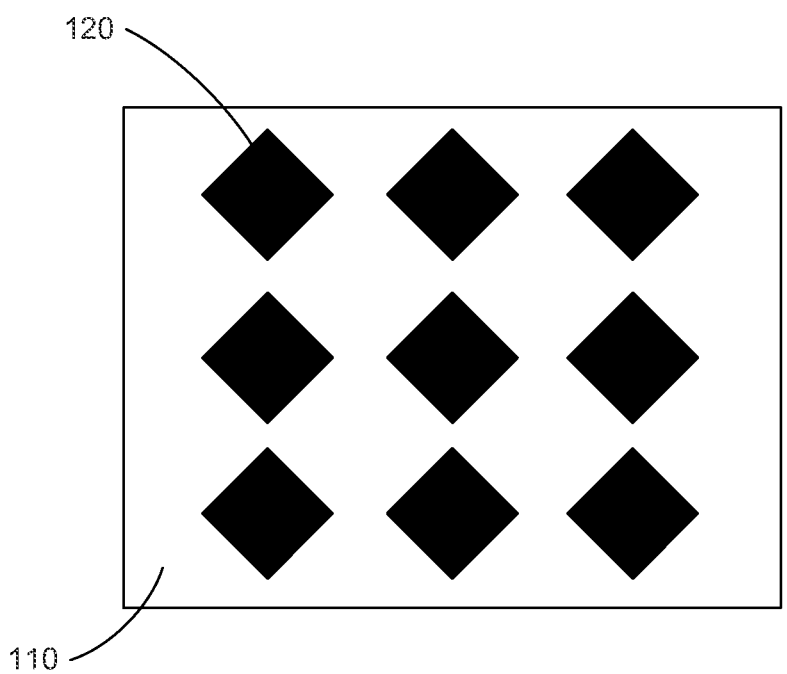
Figure 2C:
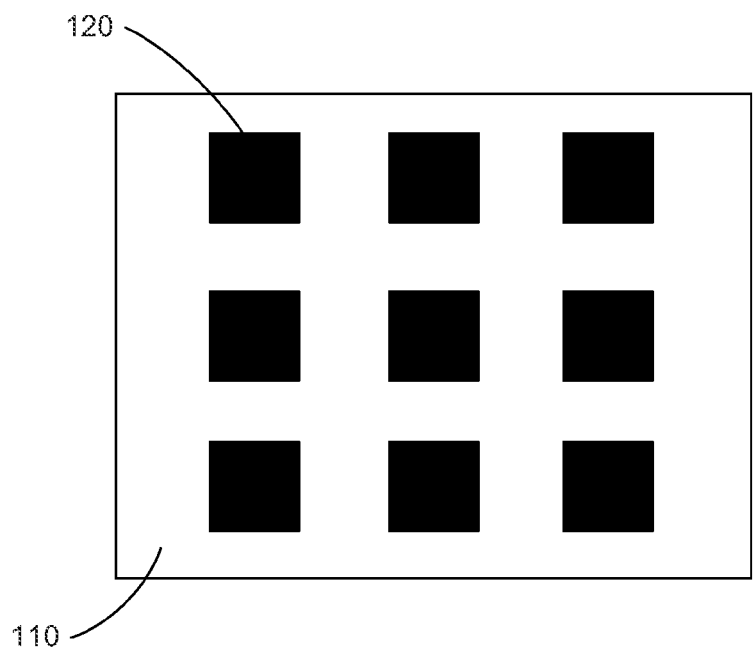
Figure 2D:
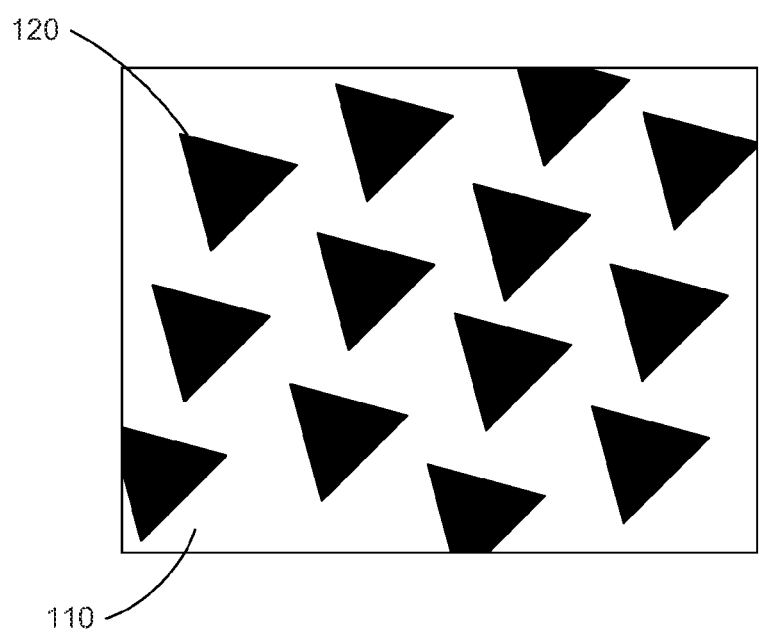
Figure 3A:
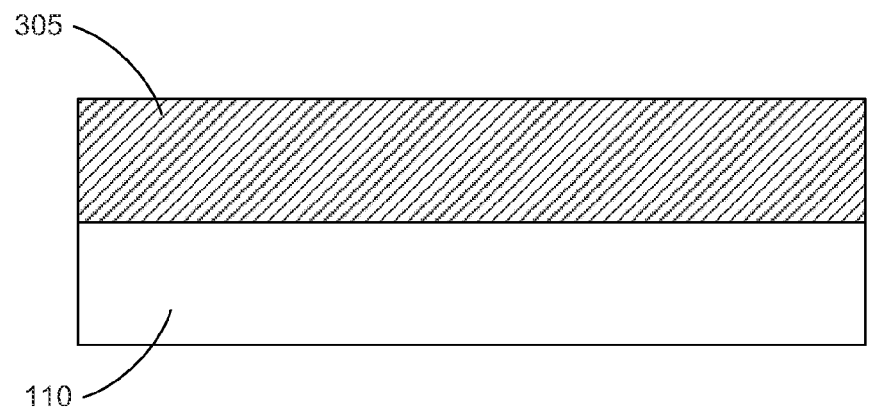
FIGS. 3A-3D are each block diagrams showing a number of stages of producing nanotubes on a metal substrate according to one example of the principles described herein.
Figure 3B:
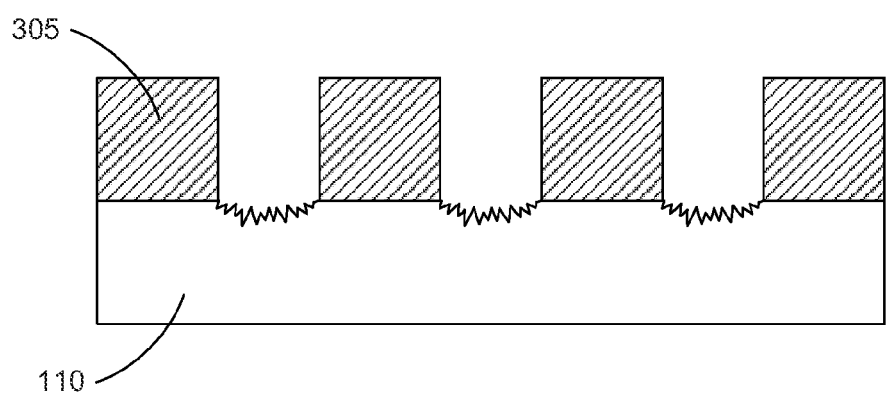
Figure 3C:
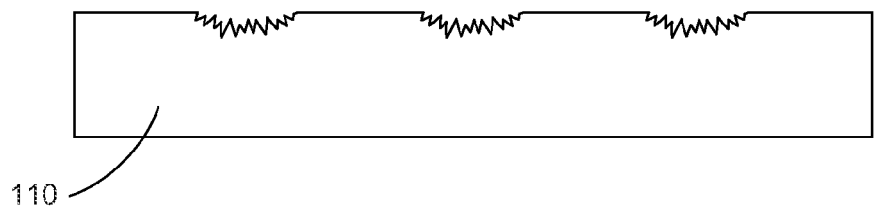
Figure 3D:
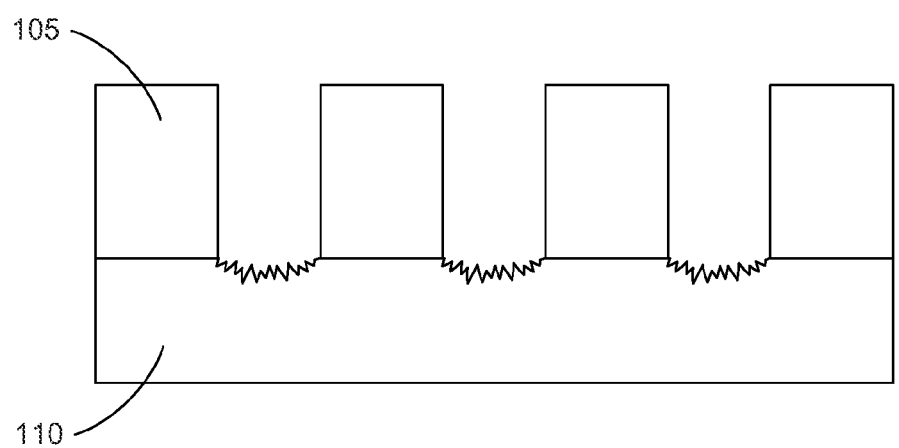

FIG. 2A shows a circular pattern of CNT bundles (120) according to one example of the principle described herein. FIG. 2B shows a diamond pattern of CNT bundles (120) according to another example of the principles described herein. FIG. 2C shows a square pattern of CNT bundles (120) according to yet another example of the principles described herein. FIG. 2D shows a triangular pattern of CNT bundles (120) according to still another example of the principles described herein. Although FIGS. 2A-2D show specific patterns, this description is not meant to be limiting and the present specification contemplates the use of any number and type of patterns of CNT bundles (120) being formed on the surface of the metal substrate (120).

As described above, the CNTs (105), CNT bundles (120), and metal substrate (110) may be formed as an electron source. In one example, an electrical source may be applied to the metal substrate (110) thereby creating electrons to be admitted from the CNTs (105) and CNT bundles (120). The patterning of the CNT bundles (120) may affect the electron emission properties of the electron emitter. In one example, the pattern of the CNT bundles (120) chosen may be based on the number of CNT bundle (120) edges (125) provided in the pattern. In this example, the more CNT bundle (120) edges (125) provided in the pattern, the more electrons will be emitted from the electron source. In one example, the distance each bundle (120) is from another bundle (120) depends on the amount of usable 2-dimensional space on the metal substrate (110) and the amount of electron discharge required during use of, for example, the electron source implementing the metal substrate (110) and CNTs (105). In one example, any individual bundle (120) may be so formed as to be around 5-10 μm apart from any other bundle (120). Specifically, an edge (125) of any given bundle (120) may be 5-10 μm away from the edge (125) of any other bundle (120). In one example, the ratio of electrons emitted from, for example, the electron source created from the metal substrate (110) and CNTs (105) may be varied by altering the distances between the individual bundles (120) of CNTs (105). In one example, the distance of the individual bundles (120) may depend on the potential of the electric field, the electric field effect, and the field enhancement effect.

Figure 4:
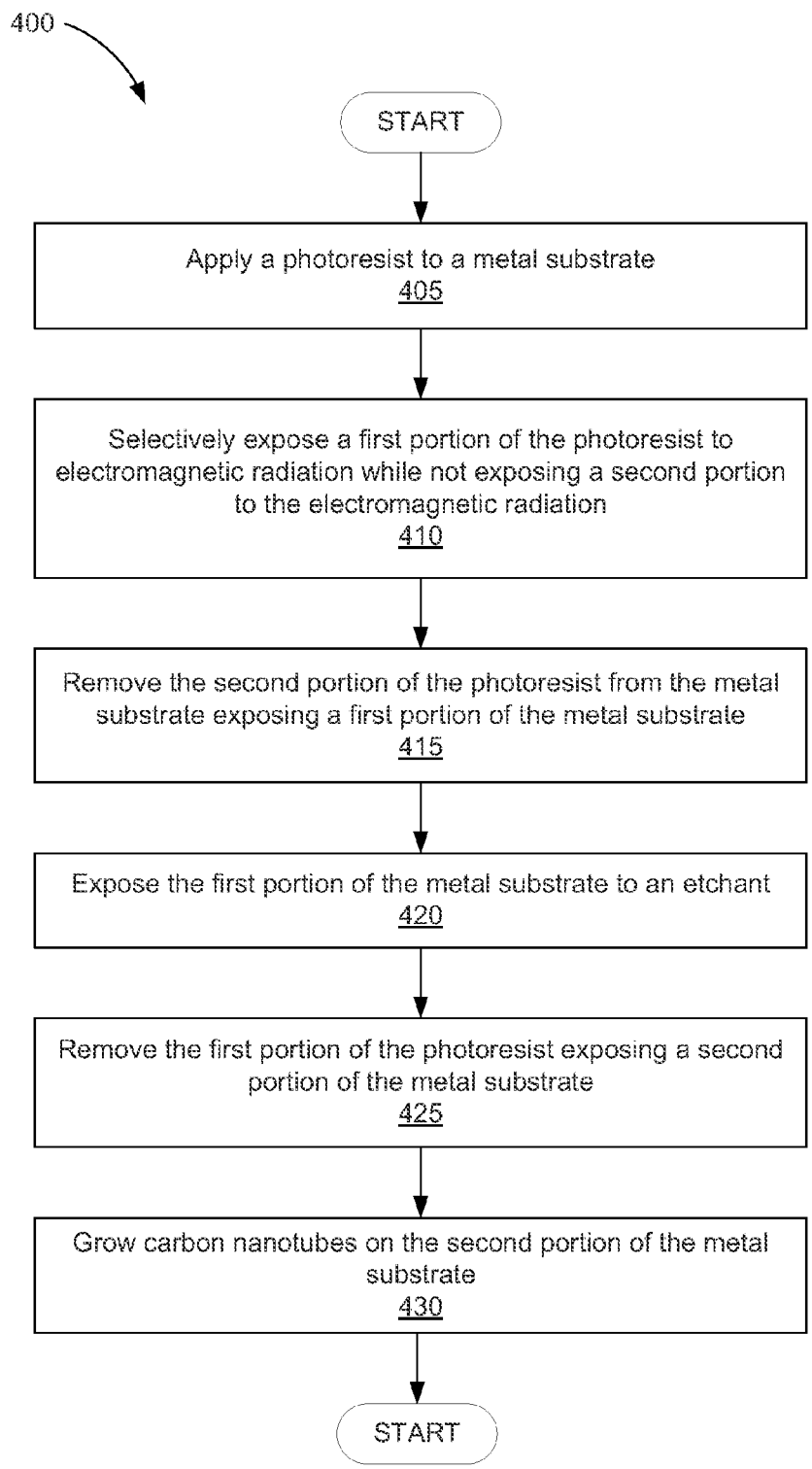
FIG. 4 is a flowchart showing a method of forming nanotubes according to one example of the principles described herein.

Turing now to FIGS. 3A-3D, a number of block diagrams are shown showing a number of stages of producing nanotubes on a metal substrate according to one example of the principles described herein. FIG. 4 is a flowchart showing a method of forming nanotubes according to one example of the principles described herein and will be described in conjunction with FIGS. 3A-3D. The method (400) may begin with applying (405) a layer of photoresist (305) to a metal substrate (110). In one example, the layer of photoresist (305) is spin coated onto the metal substrate (110). In another example, the layer of photoresist is blade coated onto the metal substrate (110). In still another example, the layer of photoresist (305) is screen coated onto the metal substrate (110). In yet another example, the layer of photoresist (305) is deposited onto the metal substrate (110) using an inkjet device.

The method (400) may continue with selectively exposing (410) a first portion of the photoresist to electromagnetic radiation while not exposing a second portion to the electromagnetic radiation. In one example, a mask may be used to cover the second portion of the photoresist layer (305) while not covering the first portion of the photoresist layer (305). In this example, those second portions of the photoresist layer (305) covered by the mask are not exposed to the electromagnetic radiation thereby not curing those second portions of the photoresist layer (305). In another example, the electromagnetic radiation selectively applied to the photoresist layer (305) may be spatially coherent such that the electromagnetic radiation is collimated. This allows for the electromagnetic radiation to expose (405) selected first portions of the photoresist layer (305) wherever the electromagnetic radiation source is pointed, leaving the second portions of the photoresist layer (410) not exposed.

The method (400) may continue with removing (415) the second portion of the photoresist layer (305) from the metal substrate (110) thereby exposing a first portion of the metal substrate (110). In one example, the second portion of the photoresist is not cured and therefore removable via any method including washing away with a non-reactive solution. In this example, the non-reactive solution may be sprayed onto the surface of the metal substrate (305) and photoresist layer (305) with sufficient force so as to dislodge the second portion of the photoresist layer (305). Other methods of removing the second portions of the photoresist layer (305) exist and the present specification contemplates the use of those other methods to achieve, at least, the effect of removing those second portions thereby exposing the first portion of the metal substrate (110) underneath.

The method may further comprise exposing (420) the first portion (310) of the metal substrate (110) to an etchant. In one example, the metal substrate (110) is immersed into an acid bath comprising three parts hydrochloric acid and one part nitric acid. Other examples comprise the use of any type of etchant including other types of acids and other portions of acids in order to etch away the first portion of the metal substrate (110) exposed in the method described herein.

The duration of time that the first portion of the first portion (310) of the metal substrate (110) may vary depending on the type of etchant used. In one example, if the metal surface (110) had a roughness of 1 nanometer root mean square (RMS) prior to application (405) of the photoresist, an order of magnitude higher in roughness may create a surface roughness where no CNTs may be grown. Consequently, the duration of time it would take to get that magnitude of surface roughness would be used during the etching process. As described above, multiple densities of CNTs can be achieved by exposing a plurality of portions of the metal substrate (110) to the same etchant for a plurality of different time durations. Consequently, the present specification contemplates multiple applications (405) of photoresist (305) and multiple applications (420) of etchant to the metal substrate (110) in order to achieve these varying density patterns.

The method (400) may further comprise removing (425) the first portion of the photoresist layer (305) to expose a second portion of the metal substrate (110). The removal (425) of the first portion of the photoresist may be accomplished by similar methods used to remove the first portion of the photoresist layer (305). In one example, the layer of photoresist (305) while either removing the first portion or second portion of the photoresist may be removed using at least two consecutive baths with a developer (e.g., MICROPOSIT 1165 developed by Dow Chemical Company and specifically made to remove MEGAPOSIT PHOTORESISTS developed by Dow Chemical Company), where each bath lasts for approximately 5 minutes at approximately 80 degrees 10 Celsius.

The second portion of the metal substrate (110) exposed (425) is the surface onto which CNTs (105) may be grown (430). The method may, therefore, continued with placing, for example, the metal substrate (110) into a carbon vapor deposition (CVD) furnace and growing (430) CNTs (105) and CNT bundles (120) on the second portions of the metal substrate. In one example the CVD furnace is an atmospheric furnace that is brought up to 750° C., a carbon containing gas is added inside the furnace, and the exhaust is set at atmospheric pressure. Other methods may be used to grow CNTs (105) on the surface of the metal substrate (110) and the present specification contemplates the use of those other methods in order to grow (430) CNTs on the second portion of the metal substrate (110).

In an alternative example, the photoresist layer (305) may be applied (405) and the selective exposure (410) of the first portion of the photoresist layer (305) may be foregone. Instead, in this example, the photoresist layer (305) may be stamped with a stamp such that the first portion of the photoresist layer (305) remains on the metal substrate (110) while the second portion is removed because the second portion of photoresist layer (305) has been pushed away from and off of the first portion of the metal substrate (110) during the stamping process. In this example, the first portion of the photoresist layer (305) may or may not be exposed to electromagnetic radiation prior to exposing the first portion of the metal substrate (110).

Figure 5:
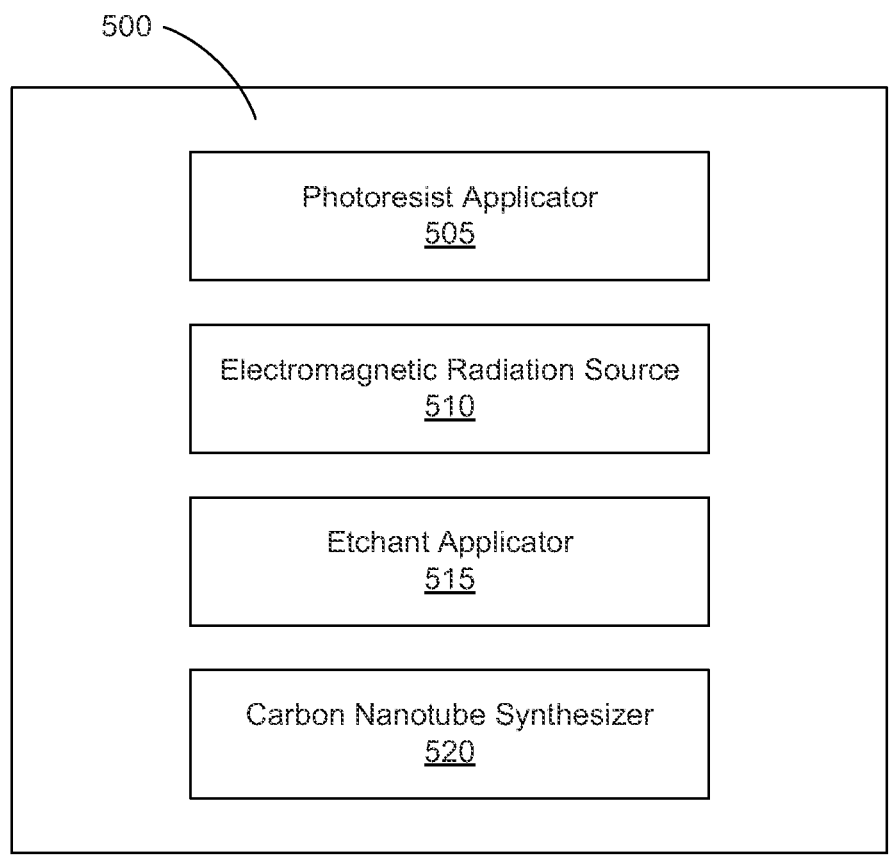
FIG. 5 is a block diagram showing a system for forming CNTs according to one example of the principles described herein.
Figure 6A:
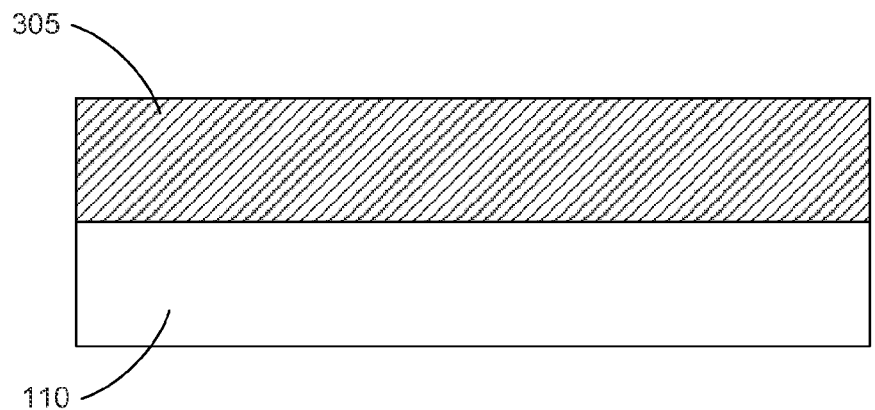
FIGS. 6A-6D are each block diagrams showing a number of stages of producing nanotubes on a metal substrate according to another example of the principles described herein.
Figure 6B:
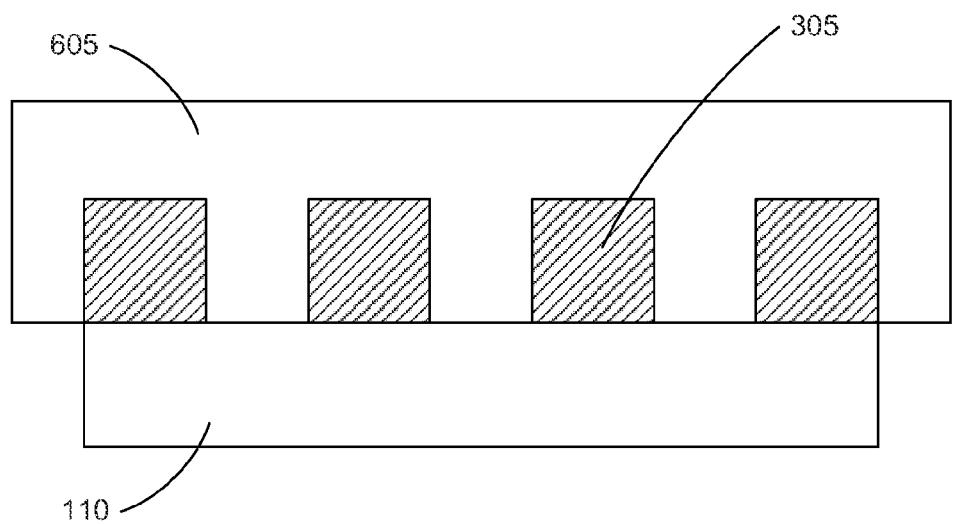
Figure 6C:
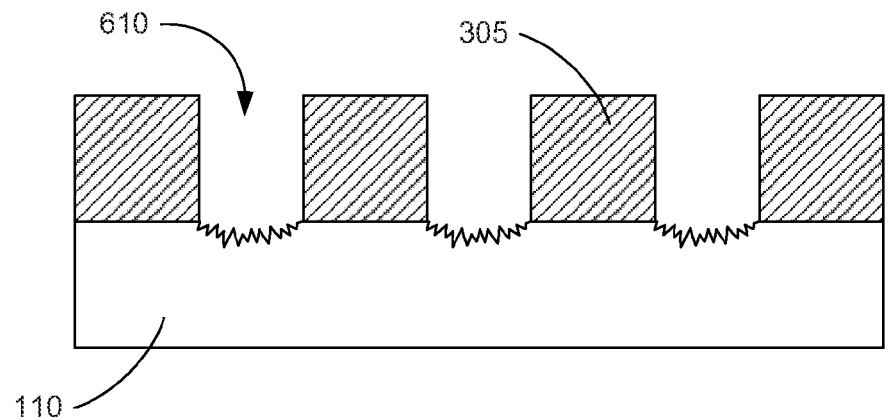
Figure 6D:
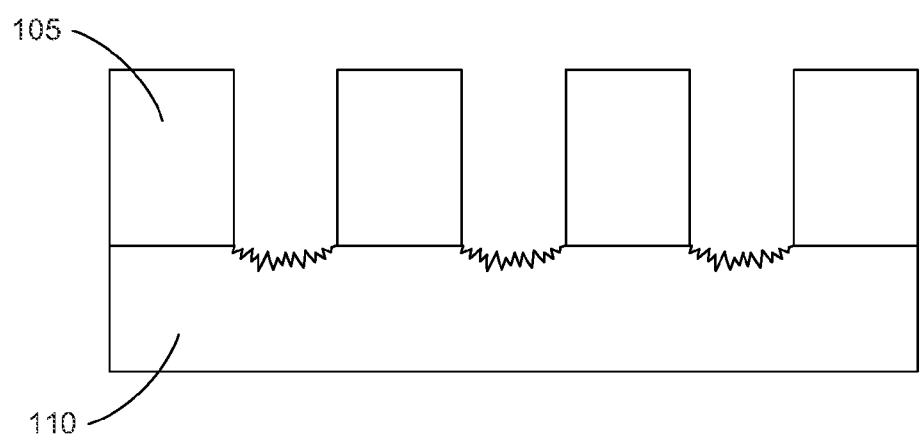

FIG. 5 is a block diagram showing a system (500) for forming CNTs according to one example of the principles described herein. The system (500) may comprise a photoresist applicator (505), an electromagnetic radiation source (510), an etchant applicator (515), and a carbon nanotube synthesizer (520). Each of these will now be described in more detail.

The photoresist applicator (505) may be any device capable of applying a layer of photoresist (305) onto a metal substrate (110). In one example, the photoresist applicator (505) may be a blade coater that drags the photoresist evenly across the surface of the metal substrate (110). In another example, the photoresist applicator (505) may be an inkjet device capable of selectively ejecting ink onto the surface of the metal substrate (110). In yet another example, the photoresist applicator (505) is a curtain coater that provides an uninterrupted curtain of photoresist that falls onto the metal substrate (110) as the metal substrate (110) is passed through the curtain of photoresist at a constant speed. Other examples exist of photoresist applicators (505) that can apply a photoresist layer (305) to the metal substrate (110) and the present specification contemplates those other examples.

The electromagnetic radiation (EMR) source (510) may be any device capable of delivering electromagnetic radiation to the surface of the layer of photoresist (305). In one example, the EMR source (510) is an ultraviolet (UV) light source. In this example, the layer of photoresist (305) is cured via UV light. In one example, the EMR source (510) is a laser source and the layer of photoresist (305) is cured using laser radiation. Other examples of an EMR source (510) exist and the present specification contemplates the use of these other EMR sources (510).

The system (500) may further comprise an etchant applicator (515). The etchant applicator (515) may be any device capable of introducing an etchant onto the first portion of the metal substrate (110). In one example, the etchant applicator is a bath into which an amount of acid is poured. The bath may be sized to fit a, or a number of, metal substrates (110) after the second portion of the photoresist has been removed (415). As described above, the etchant will etch the first portion of the metal substrate (110) such that, in one example, no CNTs will be capable of growing on.

The system (500) further comprises a carbon nanotube synthesizer (520). The carbon nanotube synthesizer (520) may be any synthesizer capable of growing CNTs on the surface of a metal substrate (110) described herein. In one example, the carbon nanotube synthesizer (520) is a carbon vapor deposition device described above. Other carbon nanotube synthesizers (520) may be used and the present specification contemplates the use of these other types of devices.

In one example, each of the photoresist applicator (505), an electromagnetic radiation source (510), an etchant applicator (515), and a carbon nanotube synthesizer (520) may be incorporated into the same device. In another example, each of the photoresist applicator (505), an electromagnetic radiation source (510), an etchant applicator (515), and a carbon nanotube synthesizer (520) may each be a separate device working in cooperation with each other.

Figure 7:
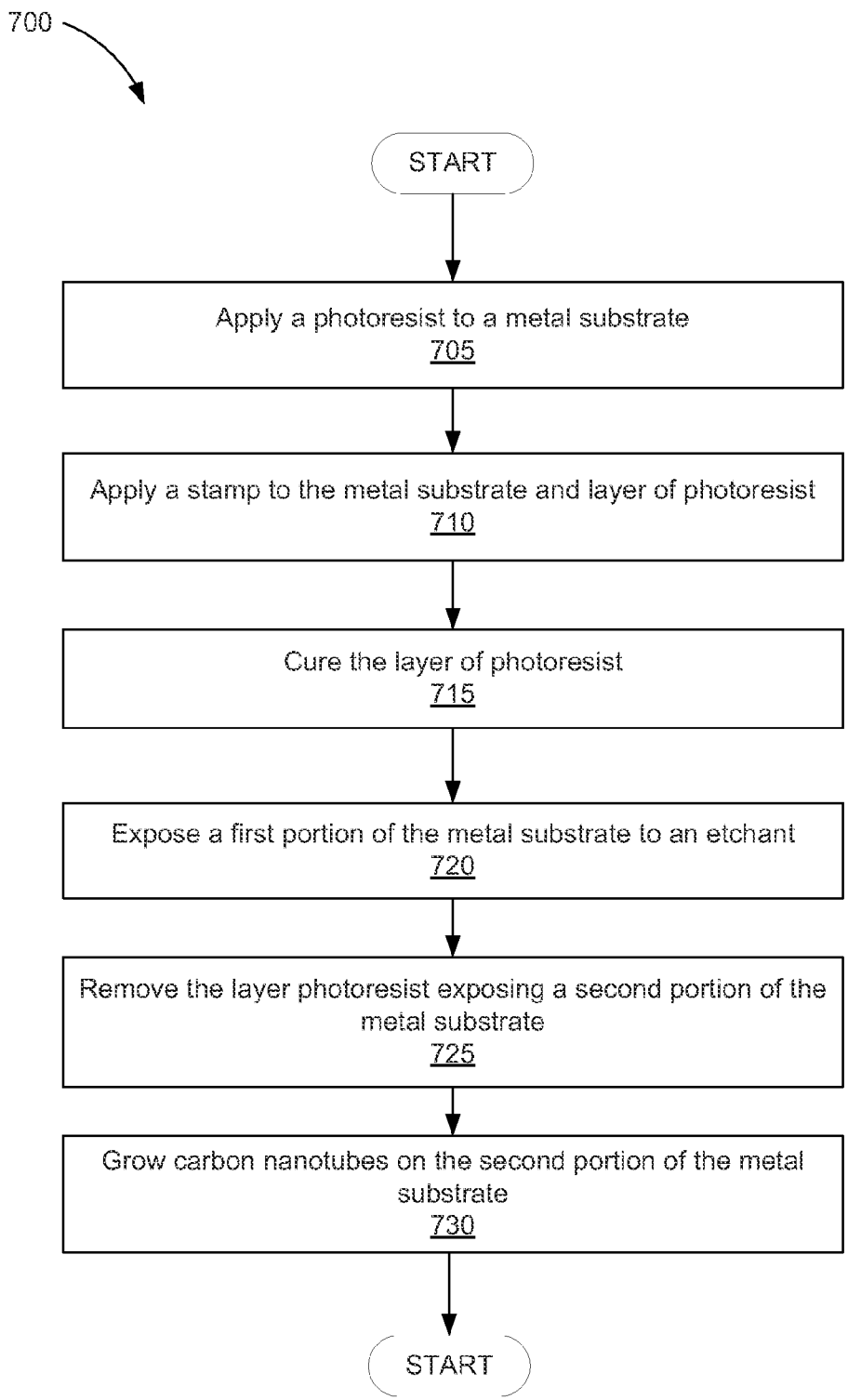
FIG. 7 is a flowchart showing a method of forming nanotubes according to another example of the principles described herein.

Turning now to FIGS. 6A-6D, a number of block diagrams show a number of stages of producing nanotubes on a metal substrate according to another example of the principles described herein. Also, FIG. 7 is a flowchart showing a method (700) of forming nanotubes according to another example of the principles described herein and will be described in connection with FIGS. 6A-6D. The method (700) may begin with applying (705) a layer of photoresist (305) to a metal substrate (110). In one example, the layer of photoresist (305) is spin coated onto the metal substrate (110). In another example, the layer of photoresist is blade coated onto the metal substrate (110). In still another example, the layer of photoresist (305) is screen coated onto the metal substrate (110). In yet another example, the layer of photoresist (305) is deposited onto the metal substrate (110) using an inkjet device.

The method (700) may continue with applying a stamp (605) to the metal substrate (110) and layer of photoresist (305). Application of the stamp (605) establishes a pattern within the layer of photoresist (305) as the stamp (605) presses down to the surface of the metal substrate (110). The pattern of the stamp (605) is a reverse of the pattern intended to be formed on the layer of photoresist (305) which in turn is a reverse of the pattern of CNTs to be grown on the metal substrate (110).

The method (700) may continue with the curing (715) of the photoresist using an EMR source (510) as described above. The curing (715) process may begin while the stamp is in contact with the layer of photoresist (305) and metal substrate (110) or may occur after the stamp has been removed. In the example where the layer of photoresist is cured (715) while the stamp is on contact with the layer of photoresist (305) and metal substrate (110), the stamp may be made out of an optically transparent material such that the electromagnetic radiation from the EMR source (510) can pass through the stamp and cure the underlying layer of photoresist (305).

The method (700) may continue as described above with exposing (720) a first portion (610) of the metal substrate (110) to an etchant. In one example, the metal substrate (110) is immersed into an acid bath comprising three parts hydrochloric acid and one part nitric acid. Other examples comprise the use of any type of etchant including other types of acids in order to etch away the first portion of the metal substrate (110) exposed in the method described herein.

The method (700) may further comprise removing (725) the photoresist layer (305) to expose a second portion of the metal substrate (110) and growing (730) CNTs on the second portion of the metal substrate (110). The removal (725) of the layer of photoresist (305) and the growing (730) of the CNTs may be accomplished via similar devices and methods as described above in connection with FIG. 4.

The CNTs (105) and metal substrates (110) described above may be used in connection with a number of devices. In one example, the CNTs (105) and metal substrates (110) may be used as an electron emitter in, for example, a cathode ray tube. In another example, the CNTs (105) and metal substrates (110) may be used as an electron emitter in a traveling wave tube amplifier for satellite communication signal amplification.

Aspects of the present system and method are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code. The computer usable program code may be provided to a processor of a general purpose computer, special purpose computer, or other programmable data processing apparatus to produce a machine, such that the computer usable program code, when executed via, for example, the processor of the computer or other programmable data processing apparatus, implement the functions or acts specified in the flowchart and/or block diagram block or blocks. In one example, the computer usable program code may be embodied within a computer readable storage medium; the computer readable storage medium being part of the computer program product. In one example, the computer readable storage medium is a non-transitory computer readable medium. In another example, the CNTs (105) and metal substrates (110) may be used as an electron emitter in x-ray diffraction systems used to help generate x-rays in order to detect metal alloys. Still further, the electron source produced via the method described herein may be used may be used in any application where lighting suitable to its characteristics is implemented such as for backlighting of a liquid crystal display (LCD) and/or other lighting applications. The electron source produced in accordance with the methods described herein may also be used in other applications, for example, as part of a solar cell or as a heat sink, among others.

The specification and figures describe forming an electron source and more specifically forming CNTs on the surface of a metal substrate. The method described herein of forming the CNTs may have a number of advantages, including a relatively faster CNT manufacturing process. Because no inhibitor or metal catalyst is deposited onto the substrate, the formation of CNTs from a metal catalyst to bundles of CNTs grown on the surface is shorter. Additionally, applying the inhibitor and metal catalysts incorporate the use of a number of specialized and sophisticated devices in order to deposit these chemicals on the substrate. Consequently, because the method described herein does not require an inhibitor or a metal catalyst the time consumed in placing the substrate in these devices is saved. Additionally, these specialized and sophisticated devices used to deposit the inhibitor and metal catalyst will not be used and therefore the process to manufacture CNTs on the metal substrate is relatively more cost effective. Still further, the present method speeds up production because the specialized and sophisticated devices can only accept a limited amount of substrate at any given time.

The preceding description has been presented to illustrate and describe examples of the principles described. This description is not intended to be exhaustive or to limit these principles to any precise form disclosed. Many modifications and variations are possible in light of the above teaching.

What is claimed is:

1. A method of forming nanotubes, comprising:
applying a photoresist to a metal substrate;
selectively exposing a first portion of the photoresist to electromagnetic radiation while not exposing a second portion to the electromagnetic radiation;
removing the second portion of the photoresist from the metal substrate exposing a first portion of the metal substrate;
exposing the first portion of the metal substrate to an etchant;
removing the first portion of the photoresist exposing a second portion of the metal substrate; and
growing carbon nanotubes on the second portion of the metal substrate.

2. The method of claim 1, wherein the metal substrate comprises nickel, iron, chromium, aluminum, or combinations thereof.

3. The method of claim 1, wherein the electromagnetic radiation is ultraviolet radiation.

4. The method of claim 1, wherein selectively exposing a first portion of the photoresist to electromagnetic radiation while not exposing a second portion to the electromagnetic radiation forms a pattern of exposed and unexposed portions of photoresist.

5. The method of claim 4, wherein the pattern of exposed and unexposed photoresist is one of a circular square, triangular, diamond, or alternating concentric rings of first and second portions of the metal substrate according to a plan view of the metal substrate as viewed from the side of the metal substrate on which the carbon nanotubes are grown.

6. The method of claim 1, wherein a nanotube growth inhibitor is not deposited on the metal substrate.

7. The method of claim 1, wherein growing of the carbon nanotubes on the second portion of the metal substrate is done by chemical vapor deposition.

8. The method of claim 1, wherein a mask is used to selectively expose a first portion of the photoresist to electromagnetic radiation while not exposing a second portion to the electromagnetic radiation.

9. A method of forming an electron source with nanotubes, comprising:
depositing a layer of photoresist onto the surface of a metal substrate;
applying a mask to the surface of the photoresist and selectively exposing a first portion of the photoresist to electromagnetic radiation while not exposing a second portion to the electromagnetic radiation;
removing the second portion of the photoresist from the metal substrate exposing a first portion of the metal substrate;
exposing the first portion of the metal substrate to an etchant;
removing the first portion of the photoresist exposing a second portion of the metal substrate; and
growing nanotubes on the second portion of the metal substrate;
wherein growing nanotubes on the second portion of the metal substrate further comprises, before growing nanotubes on the second portion of the metal substrate:
depositing a subsequent layer photoresist onto the surface of the metal substrate;
applying a mask to the surface of the photoresist and selectively exposing a third portion of the photoresist to electromagnetic radiation while not exposing a fourth portion to the electromagnetic radiation;
removing the fourth portion of the photoresist from the metal substrate exposing a third portion of the metal substrate;
exposing the first portion of the metal substrate to the etchant;
removing the third portion of the photoresist exposing a third portion of the metal substrate.

10. The method of claim 9, wherein the metal substrate comprises nickel, iron, chromium, aluminum, or combinations thereof.

11. The method of claim 9, wherein the electromagnetic radiation is ultraviolet radiation.

12. The method of claim 9, wherein selectively exposing a first portion of the photoresist to electromagnetic radiation while not exposing a second portion to the electromagnetic radiation forms a pattern of exposed and unexposed portions of photoresist.

13. The method of claim 12, wherein the pattern one of a circular square, triangular, diamond, or alternating concentric rings of first and second portions of the metal substrate according to a plan view of the metal substrate as viewed from the side of the metal substrate on which the carbon nanotubes are grown.

14. The method of claim 9, wherein a nanotube growth inhibitor is not deposited on the metal substrate.

15. The method of claim 9, wherein growing nanotubes on the second portion of the metal substrate further comprises growing nanotubes on the third portion of the metal substrate wherein the density of the nanotubes grown on the second portion of the metal substrate differs from the density of nanotubes grown on the third portion of the metal substrate.

16. A system for forming nanotubes, comprising:
a photoresist applicator to apply a photoresist to a metal substrate;
an electromagnetic radiation source to selectively apply a first portion of the photoresist to electromagnetic radiation while not exposing a second portion to the electromagnetic radiation;
an etchant applicator to expose a first portion of the metal substrate to an etchant, the first portion of metal substrate being exposed after removing the second portion of the photoresist from the metal substrate; and
a carbon nanotube synthesizer to grow carbon nanotubes on the second portion of the metal substrate.

17. The system of claim 16, wherein the metal substrate comprises nickel, iron, chromium, aluminum, or combinations thereof.

18. The system of claim 16, wherein the carbon nanotube synthesizer is a chemical vapor depositor.

19. The system of claim 16, wherein the electromagnetic radiation source selectively exposes a first portion of the photoresist to electromagnetic radiation while not exposing a second portion to the electromagnetic radiation to form a pattern of exposed and unexposed portions of photoresist.

20. A method of forming nanotubes, comprising:
applying a photoresist to a metal substrate;
selectively exposing a first portion of the photoresist to electromagnetic radiation while not exposing a second portion to the electromagnetic radiation;
removing the second portion of the photoresist from the metal substrate exposing a first portion of the metal substrate;
exposing the first portion of the metal substrate to an etchant;
removing the first portion of the photoresist exposing a second portion of the metal substrate; and
growing carbon nanotubes on the second portion of the metal substrate;
wherein a nanotube growth inhibitor is not deposited on the metal substrate.

* * * * *